(12) United States Patent
Tatsuzawa et al.

(10) Patent No.: US 7,535,811 B2
(45) Date of Patent: May 19, 2009

(54) DISK DEVICE AND DISK REPRODUCTION METHOD THAT PREVENTS A WRONG REPRODUCING OPERATION WHEN A DEFECT ON THE DISK IS DETERMINED

(75) Inventors: Yukiyasu Tatsuzawa, Yokohama (JP); Koichi Otake, Yokohama (JP); Hideyuki Yamakawa, Kawasaki (JP); Hiroyuki Moro, Ome (JP); Toshihiko Kaneshige, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 693 days.

(21) Appl. No.: 10/994,529

(22) Filed: Nov. 23, 2004

(65) Prior Publication Data

US 2005/0117484 A1 Jun. 2, 2005

(30) Foreign Application Priority Data

Nov. 28, 2003 (JP) ............................. 2003-400901

(51) Int. Cl.
*G11B 7/005* (2006.01)
(52) U.S. Cl. ................................... 369/59.22
(58) Field of Classification Search ........................ None
See application file for complete search history.

(56) References Cited

U.S. PATENT DOCUMENTS

| | | | | |
|---|---|---|---|---|
| 6,009,537 | A * | 12/1999 | Tanimoto et al. ................ | 714/8 |
| 6,124,997 | A * | 9/2000 | Hirasaka ........................ | 360/65 |
| 6,643,452 | B1 * | 11/2003 | Ohbi ............................. | 386/95 |
| 7,126,894 | B2 * | 10/2006 | Akiyama .................... | 369/47.5 |

FOREIGN PATENT DOCUMENTS

| | | |
|---|---|---|
| JP | 1-50992 | 11/1989 |
| JP | 05-128729 | 5/1993 |
| JP | 09-245435 | 9/1997 |
| JP | 2003-77230 | 3/2003 |
| JP | 2003-157528 | 5/2003 |

OTHER PUBLICATIONS

Japanese Office Action dated Nov. 27, 2007 for Appln. No. 2003-400901.
Journal of the Institute of Electronics, Information and Communication Engineers, vol. 81, No. 5, pp. 497-505, May 1998.

* cited by examiner

*Primary Examiner*—Peter Vincent Agustin
(74) *Attorney, Agent, or Firm*—Pillsbury Winthrop Shaw Pittman, LLP (57) ABSTRACT

A disk device includes a reading section which reads reflected light and outputs a read signal according to the read reflected light, a processing section which calculates an adjustment value from the read signal, performs predetermined processing on the read signal based on the adjustment value, and outputs a process signal, a detecting section which detects a reading defect in the reading section based on the read signal, a determining section which determines signal quality of the process signal output from the processing section, a storage section which stores the adjustment value calculated by the processing section, in a memory area, based on a result output from the determining section, and a controller which, when the detecting section detects the reading defect, performs control so that the adjustment value is read out of the storage section and is supplied to the processing section.

2 Claims, 12 Drawing Sheets

DISK DEVICE AND DISK REPRODUCTION METHOD THAT PREVENTS A WRONG REPRODUCING OPERATION WHEN A DEFECT ON THE DISK IS DETERMINED

CROSS-REFERENCE TO RELATED APPLICATIONS

This application is based upon and claims the benefit of priority from prior Japanese Patent Application No. 2003-400901, filed Nov. 28, 2003, the entire contents of which are incorporated herein by reference.

BACKGROUND OF THE INVENTION

1. Field of the Invention

The present invention relates to a disk device that reproduces information recorded on a disk, and more particularly, to a disk device that prevents a wrong reproducing operation when a defect is caused on a disk, and also relates to a disk reproduction method.

2. Description of the Related Art

In recent years, recording and reproduction apparatuses for optical disks such as DVDs (Digital Versatile Disks) have been widely used, and various types of apparatuses have been developed and put into practical use.

Particularly, high-density recording has been rapidly developed in the field of optical recording and reproduction, and linear recording density has greatly increased. Also, as the laser wavelengths are becoming shorter and the lens aperture is becoming greater, deterioration of reproduction signal quality due to tilting is becoming more and more conspicuous. To counter this problem, the PRML (Partial Response and Maximum Likelihood) signal processing method is being applied to many cases. This method is suitable for optical disk devices. By the PRML signal processing method, higher signal quality can be achieved even with high-density information recorded on an optical disk, compared with signal quality that can be obtained by a conventional level slice method. Therefore, there is a great possibility that the PRML signal processing method will be applied to next-generation optical disks that are designed for HD image recording.

On the other hand, since the objects to be handled with an optical disk device are removable disks, unlike with a hard disk device, stable signal reproduction is expected even from a disk having dust, dirt, or fingerprints on it, or having defects such as scratches. If a defect occurs, disturbed signals cannot be properly reproduced, and the adverse influence remains in the filter that manages the control values for reproduction signals. Therefore, even after a recovery from the defect, abnormal data might be generated from normal data over a certain period of time. Taking measures against defects is essential for an optical disk device that performs high-density recording and reproduction according to the PRML method.

Patent document 1 (Jpn. Pat. Appln. KOKAI Publication No. 2003-157528) discloses a method of detecting a defect by monitoring the amplitude level of each RF signal. In this method, the envelope detection result of each RF signal is used to detect a variation of the amplitude of each RF signal, because the amount of reflected laser light is varied when a defect occurs. As a measure to be taken against defects, the control value of each signal processing section obtained immediately before the defect detection is held so as to restrict the influence of the defect upon the reproducing operation.

Patent document 2 (Jpn. Pat. Appln. KOKOKU Publication No. 1-50992) also discloses such a method.

According to the prior art disclosed in the above-described patent document, when a defect is detected from a change in the envelope of a RF signal, the control value of each signal processing section obtained immediately before the defect detection is held so as to restrict the adverse influence of the defect upon the reproducing operation. By this method, however, problems such as a detection delay in the defect detector are not taken into consideration. More specifically, since a delay is caused before a defect is detected, the control value immediately before the defect detection might be a control value generated during the period of the defect occurrence, and therefore, might be inappropriate as a held value of a control value for achieving high-quality signal reproduction during the defect recovery time and immediately after a recovery from the defect. For example, if a held control value obtained from the inner periphery of the disk represents a safe amount, the control value is not appropriate for being used on the outer periphery of the disk, because the information is already old and an in-plane variation could be caused on the disk.

BRIEF SUMMARY OF THE INVENTION

An embodiment of the present invention is a disk device comprising: a reading section which reads light reflected by a disk, and outputs a read signal according to the read reflected light; a processing section which calculates an adjustment value from the read signal, performs predetermined processing on the read signal based on the adjustment value, and outputs a process signal; a detecting section which detects a reading defect in the reading section based on the read signal; a determining section which determines signal quality of the process signal output from the processing section; a storage section which stores the adjustment value calculated by the processing section, in a memory area, based on a result output from the determining section; and a controller which, when the detecting section detects the reading defect, performs control so that the adjustment value is read out of the storage section and is supplied to the processing section.

DETAILED DESCRIPTION OF THE INVENTION

Figure 1:
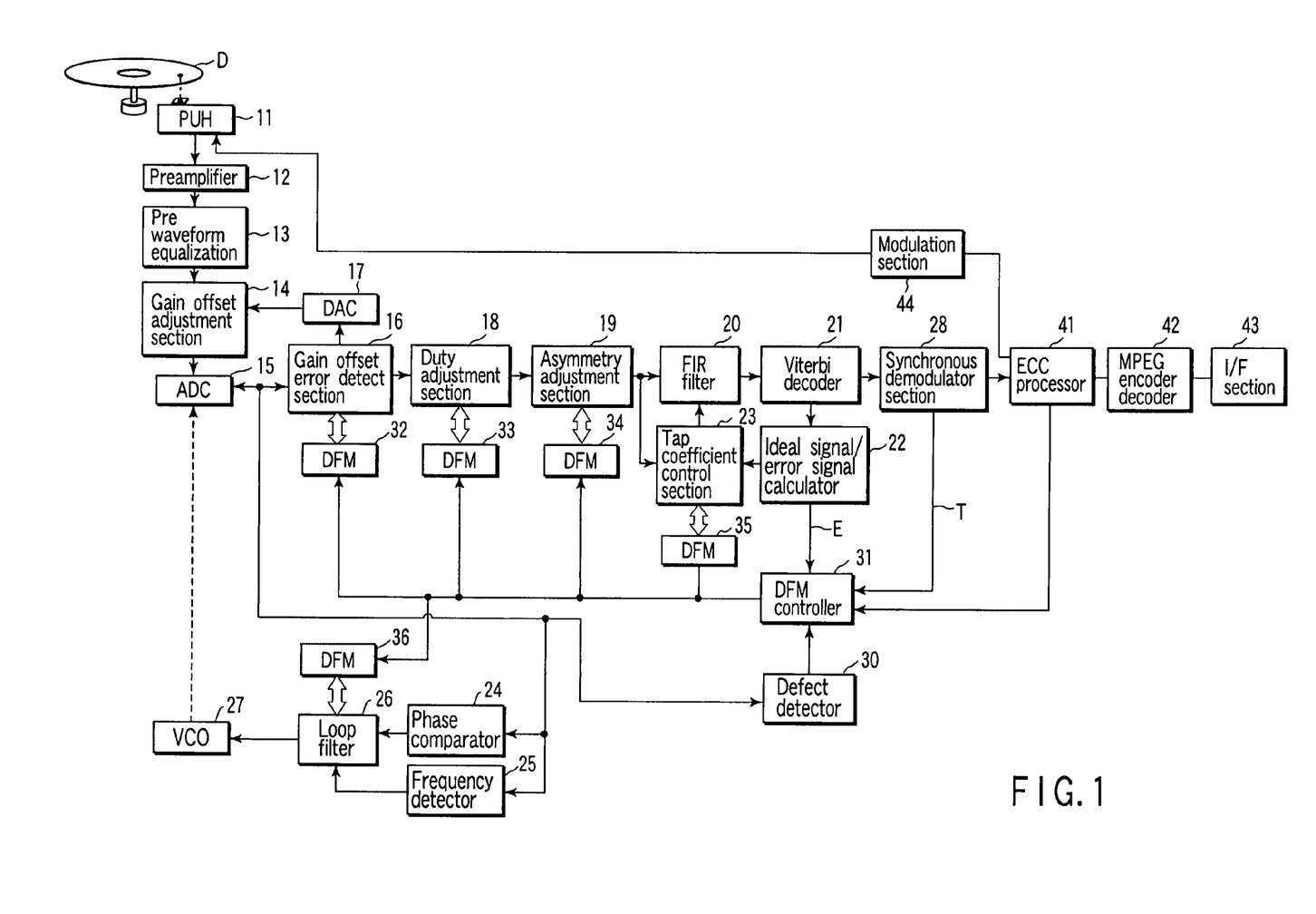
FIG. 1 is a block diagram illustrating an example configuration of an optical disk device according to the present invention.
Figure 2:
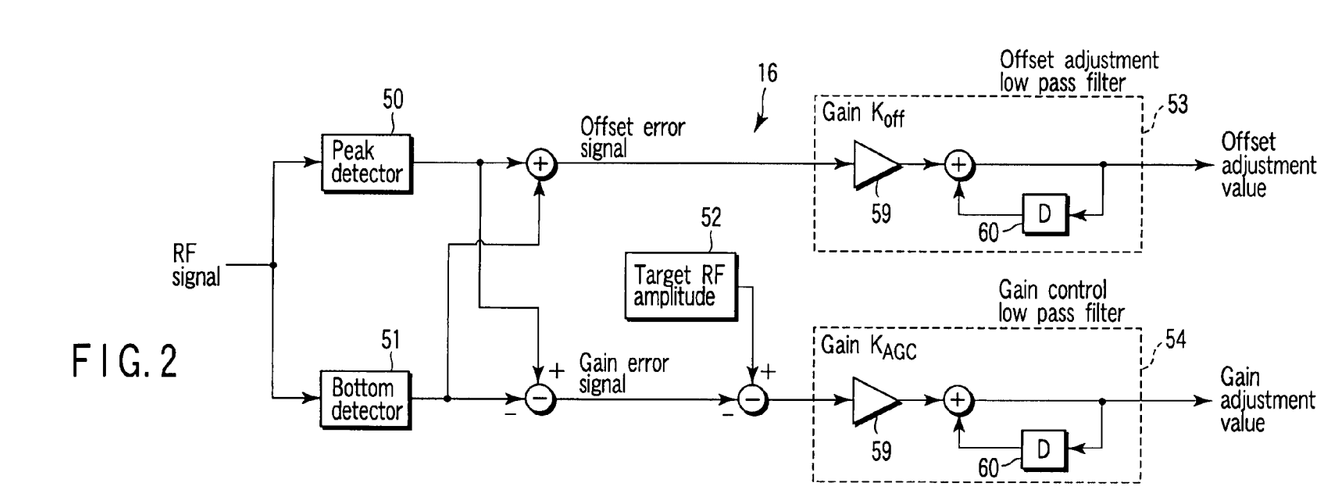
FIG. 2 is a block diagram illustrating an example configuration of a gain offset error detect section of the optical disk device according to the invention.
Figure 3:
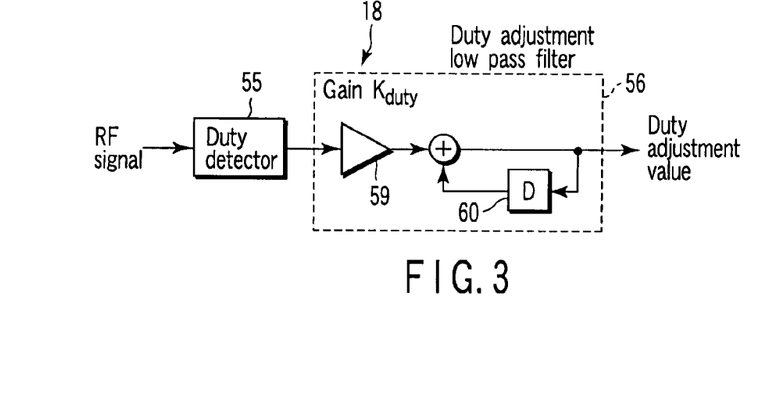
FIG. 3 is a block diagram illustrating an example configuration of a duty adjustment section of the optical disk device according to the invention.
Figure 4:
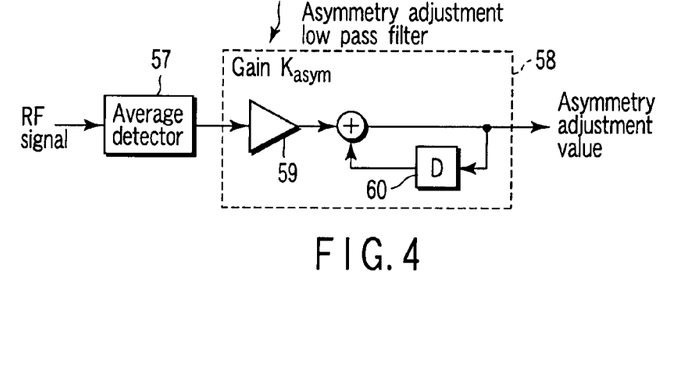
FIG. 4 is a block diagram illustrating an example configuration of an asymmetry adjustment section of the optical disk device according to the invention.
Figure 5:
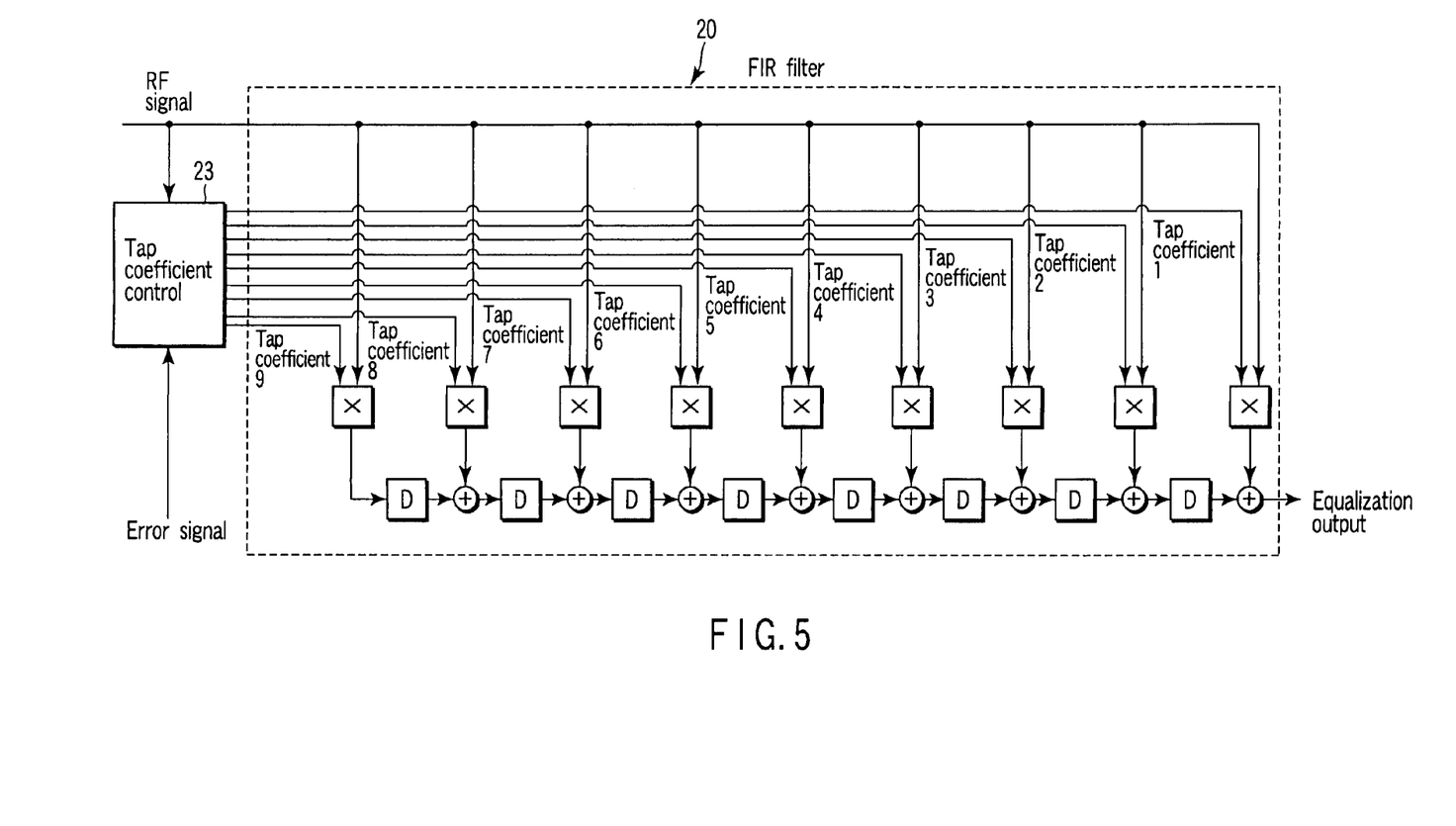
FIG. 5 is a block diagram illustrating an example configuration of a FIR filter of the optical disk device according to the invention.
Figure 6:
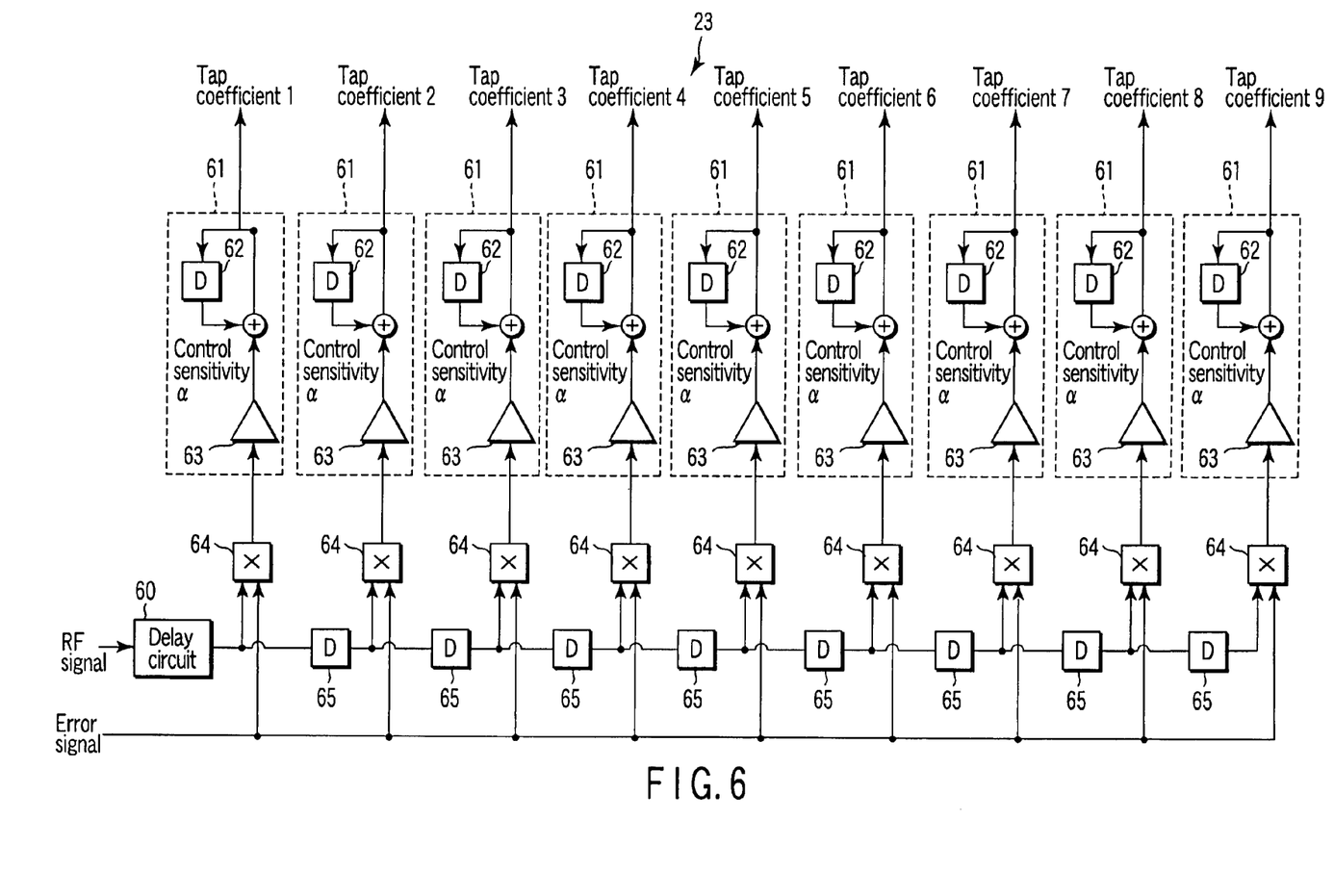
FIG. 6 is a block diagram illustrating an example configuration of a tap coefficient control section of the optical disk device according to the invention.
Figure 7:
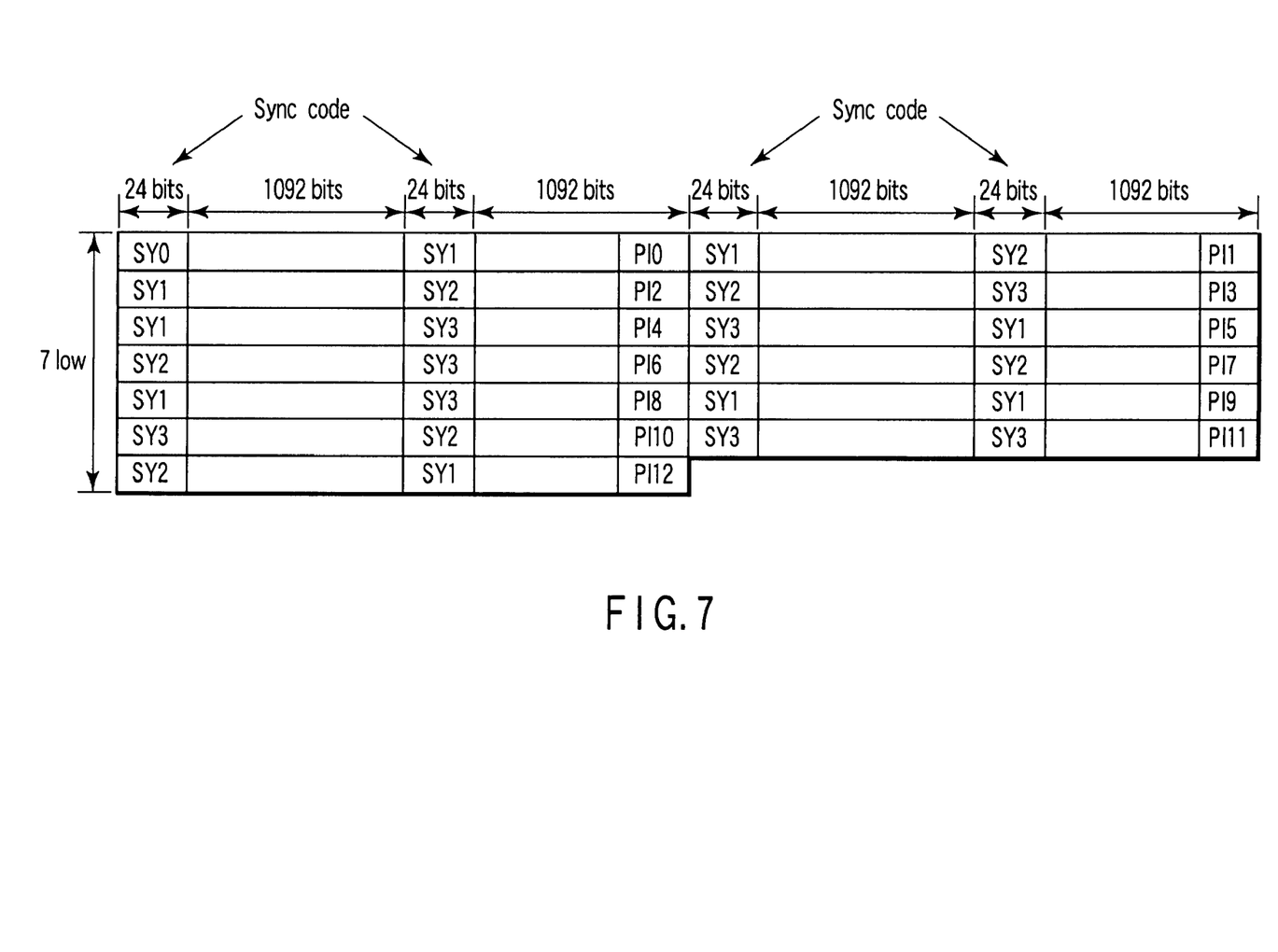
FIG. 7 illustrates an example of a frame synchronization signal of an optical disk that is to be reproduced by the optical disk device according to the invention.
Figure 8:
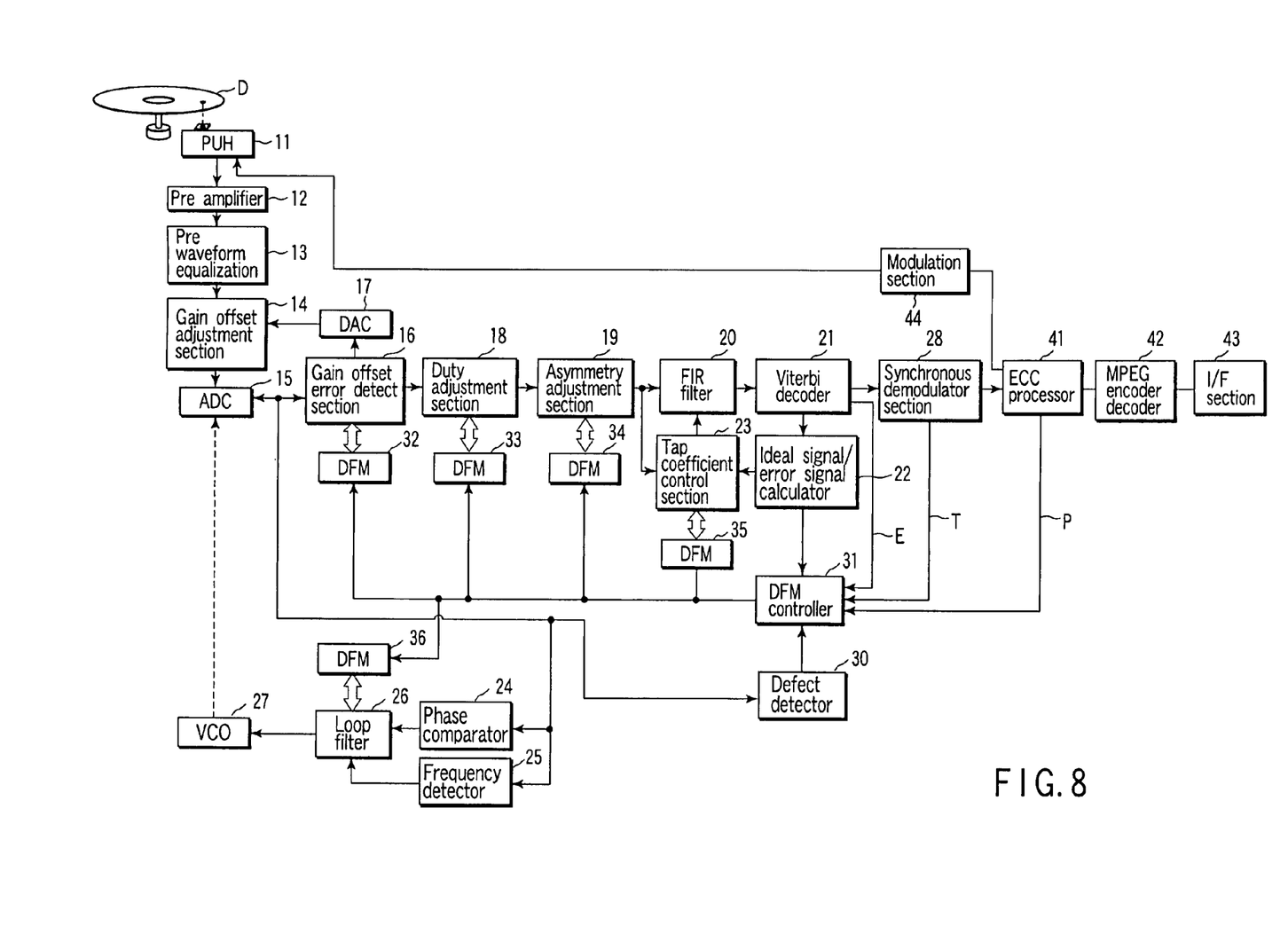
FIG. 8 is a block diagram illustrating another example configuration of the optical disk device according to the invention.
Figure 9:
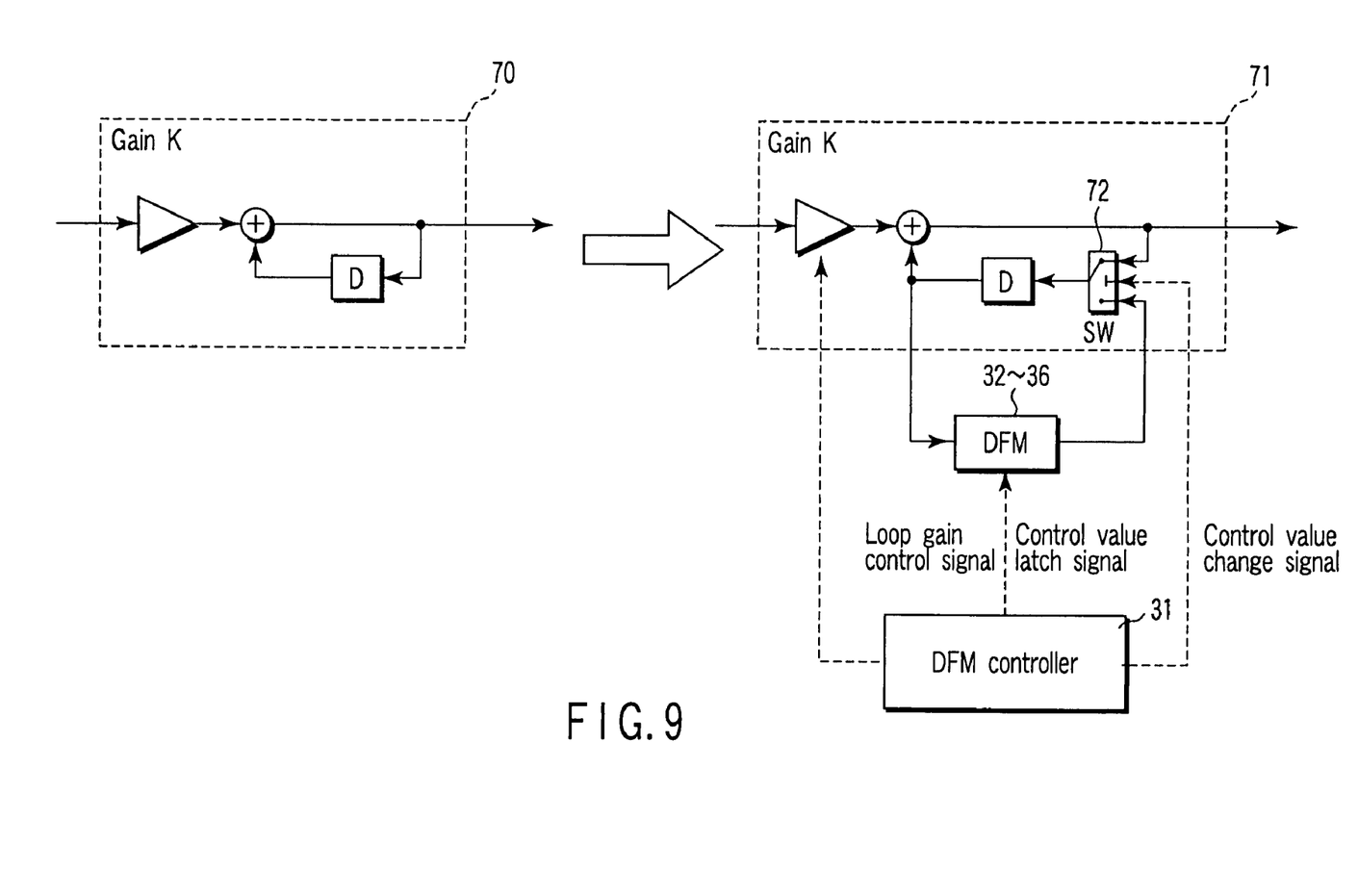
FIG. 9 shows an example of the relationship between a DFM and a DFM controller of the optical disk device according to the invention.
Figure 10:
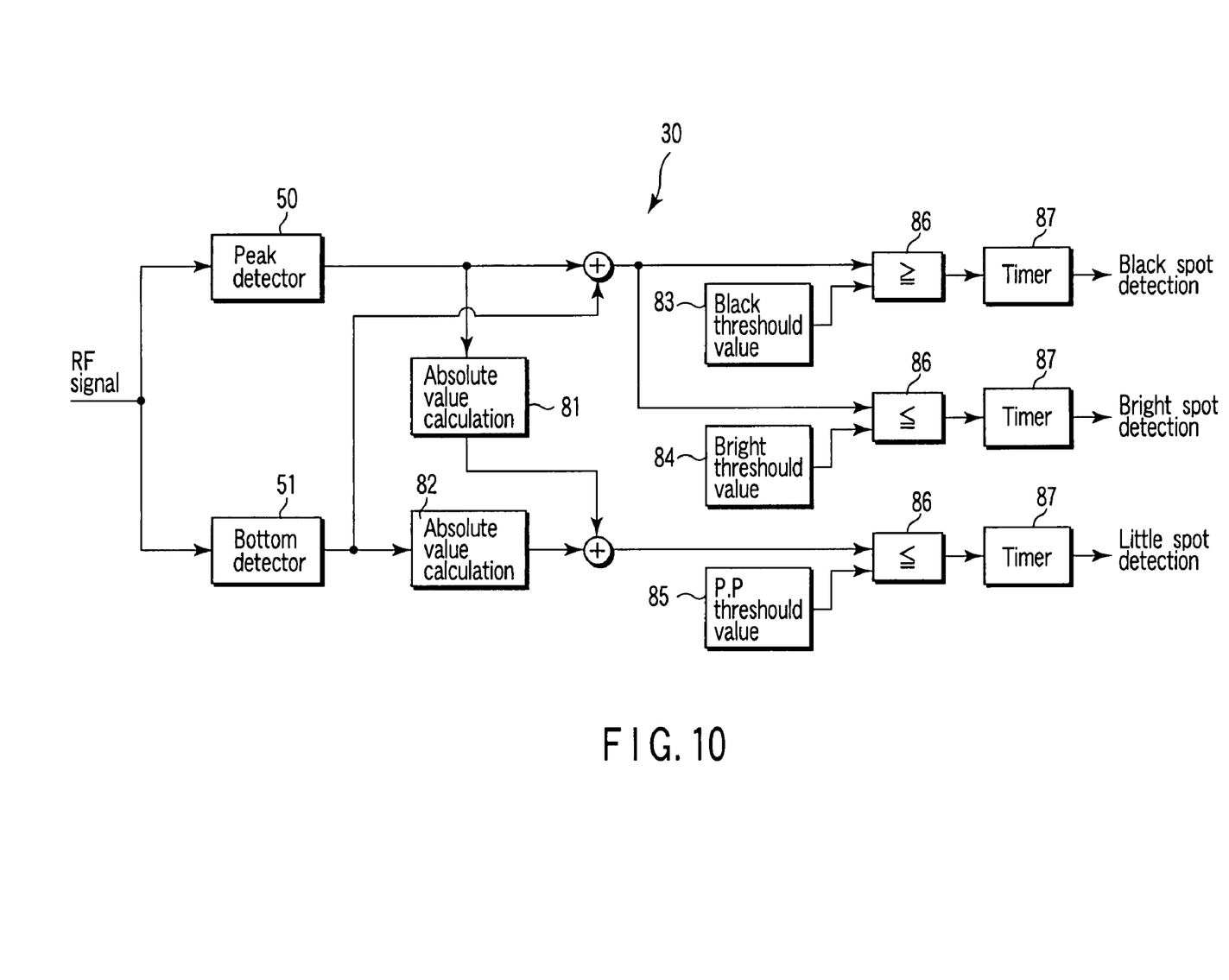
FIG. 10 illustrates an example configuration of a defect detector of the optical disk device according to the invention.

The following is a detailed description of embodiments of the present invention, with reference to the accompanying drawings. FIG. 1 is a block diagram of an example configuration of an optical disk device according to the invention. FIG. 2 is a block diagram of an example configuration of a gain offset error detect section of the optical disk device according to the invention. FIG. 3 is a block diagram of an example configuration of a duty adjustment section of the optical disk device according to the invention. FIG. 4 is a block diagram of an example configuration of an asymmetry adjustment section of the optical disk device according to the invention. FIG. 5 is a block diagram of an example configuration of a FIR filter of the optical disk device according to the invention. FIG. 6 is a block diagram of an example configuration of the tap coefficient control section of the optical disk device according to the invention. FIG. 7 illustrates examples of frame synchronization signals of an optical disk that is to be reproduced with the optical disk device according to the invention. FIG. 8 is a block diagram of another example configuration of the optical disk device according to the invention. FIG. 9 illustrates the relationship between a DFM and a DFM controller of the optical disk device according to the invention. FIG. 10 illustrates an example configuration of a defect detector of the optical disk device according to the invention.

(Configuration)

In the following, an optical disk device is described in detail as a disk device according to the present invention, with reference to the accompanying drawings. The optical disk device according to the invention includes: a PUH (Pick Up Head) 11 that irradiates a reproducing or recording disk D such as a DVD (Digital Versatile Disk) with lasers, and reads the reflected rays; a preamplifier 12 that amplifies weak analog electric signals that are read signals; a pre waveform equalizer 13 that rectifies the waveforms of the amplified signals; and a gain offset adjustment section 14 that adjusts the gain and offset of each of the rectified signals. The optical disk device further includes: an A-D converter (ADC) 15 that converts analog signals into digital signals; a gain offset error detect section 16 that receives the output of the A-D converter 15; and a D-A converter (DAC) 17 that obtains digital signals converted from the errors, and returns the digital signals to the gain offset adjustment section 14. The optical disk device according to the invention further includes: a duty adjustment section 18 that adjusts the duty ratio of the output of the gain offset adjustment section 14; an asymmetry adjustment section 19 that performs asymmetry adjustment; and a FIR filter 20 that is connected to the asymmetry adjustment section 19. In the optical disk device, a viterbi decoder 21 performs viterbi decoding. An ideal signal/error signal calculator 22 then calculates an equalization error signal from the output of the viterbi decoder 21, and the error signal is supplied to a tap coefficient control section 23. From the output of the asymmetry adjustment section 19 and the error signal, the tap coefficient control section 23 calculates a tap coefficient to be supplied to the FIR filter 20. The optical disk device further includes: a phase comparator 24 and a frequency detector 25 to form a PLL (Phase Locked Loop) and receive the output of the ADC 15; a loop filter 26 that receives the outputs of the phase comparator 24 and the frequency detector 25; and a VCO (Voltage Controlled Oscillator) 27 that generates a signal from the output of the loop filter 26. The optical disk device further includes: an ECC processor 41 that performs error correction upon receipt of the output of a synchronous demodulator section 28; a MPEG encoder decoder 42 that performs MPEG decoding on the output signal of the ECC processor 41, and performs encoding at the time of recording; an I/F section 43 that receives signals from an external device or outputs signals to an external device; and a modulation section 44 that performs signal modulation at the time of recording.

The optical disk device according to the invention further includes: a defect detector 30 that is connected to the ADC 15 to perform defect processing, which is a feature of the present invention; a DMF controller 31 that actually performs the defect processing according to the output of the defect detector 30; and DMFs (DeFect management Memories) 32 to 36 that store an adjustment value, and then read and use the adjustment value under the control of the DMF controller 31.

In the optical disk device according to the present invention shown in FIG. 8, an error signal E is supplied from the ideal signal/error signal calculator 22 to the DFM controller 31. As shown in FIG. 9, in a case where the control value and the adjustment value in a filter 70, which are stored in each of the signal processing sections (including the gain offset error detect section 16, the duty adjustment section 18, the asymmetry adjustment section 19, the tap coefficient control section 23, and the loop filter 26), are disturbed by a defect, the control value and the adjustment value of a frame located a few frames earlier are supplied under the control of the DFM controller 31 and the DFMs 32 to 36.

(Basic Operation)

The optical disk device having the above-described configuration according to the invention performs an optical disk reproducing operation in the following manner.

The information recorded on the optical disk D is first reproduced as weak analog electric signals with the PUH (Pick Up Head) 11. The analog signals are amplified to a sufficiently high level as RF signals by the preamplifier 12, and the high-frequency components of the amplified signals are boosted to a certain level by the pre waveform equalizer 13. To remove the DC components, the RF signals then pass through a high pass filter (HPF) of approximately 1 kHz.

The amplification level and the offset value of the RF signals are then adjusted by the analog gain offset adjustment section 14, so that the RF signals can fill the dynamic range of the ADC (Analog to Digital Converter) 15. The gain adjustment value and the offset adjustment value are detected through digital processing by the gain offset error detect section 16, which is located at a stage after the ADC 15, and are then transmitted to the gain offset adjustment section 14 through the DAC 17.

In a specific example configuration of the gain offset error detect section 16, RF signals are envelope detected as shown in FIG. 2, and a calculation is performed using the peak value and the bottom value of the RF signals. In FIG. 2, the gain offset error detect section 16 includes: a peak detector 50 and a bottom detector 51 that receive RF signals; a target RF amplitude section 52 that is connected to the bottom detector 51; and an offset adjustment low pass filter 53 and a gain control low pass filter 54 that receive each signal. The offset adjustment low pass filter 53 has an amplifier 59 with a predetermined amplifying ratio K and a flip-flop circuit 60. The gain control low pass filter 54 also has an amplifier 59 with a predetermined amplifying ratio K and a flip-flop circuit 60.

FIG. 10 shows a specific example configuration of the defect detector 30. As shown in FIG. 10, the defect detector 30 includes: a peak detector 50 and a bottom detector 51 that receive RF signals; absolute value calculation sections 81 and 82 that are respectively connected to the peak detector 50 and the bottom detector 51; a comparator 86 that is connected to the peak detector 50 and is compared with a black threshold value 83 so as to detect a black spot; a timer 87; another comparator 86 that is also connected to the peak detector 50 and is compared with a bright threshold value 84 so as to detect a bright spot (a luminous defect); another timer 87; yet another comparator 86 that is connected to the bottom detector 51 and is compared with a P.P (Peak to Peak) threshold value 85 so as to detect a minute amplitude defect; and yet another timer 87.

The gain offset error detect section 16 uses the sum signal of the peak value and the bottom value as an offset error signal, and uses the difference signal of the peak value and the bottom value as a gain error signal. The offset error signal and the gain error signal are controlled by primary filters (low pass filters). Since the gain offset error detect section 16 is operationally an integrator, control values are held in the flip-flop circuit 60 of each filter. When a read signal that is read at a time of a defect is input to the circuits, the peak value and the bottom value in the envelope detection become very different from the desired values, and, as a result, the adjustment value in each filter is greatly disturbed.

Subsequently, the duty adjustment section 18 removes code offset components from RF signals. Since the principal object of the gain offset adjustment section 14 is to keep RF signals within the dynamic range, a difference is caused between an adjusted offset level and an optimum offset level as a signal when asymmetry components are contained in the RF signals. Therefore, the duty adjustment section 18 performs adjustment in such a manner that the duty ratios of the RF signal components become uniform. In this duty adjustment, a duty adjustment low pass filter 56 is used at a stage after a duty detector 55, as shown in FIG. 3. As the adjustment value is kept in the filter, it is adversely affected by a defect.

A RF signal with which the offset value is adjusted in terms of codes is then input to the asymmetry adjustment section 19 to compensate for the asymmetry components. The asymmetry adjustment section 19 may detect vertical asymmetry of RF amplification from the area ratio or the like, and then perform asymmetry multiplication so as to compensate for the asymmetry components. Like the duty adjustment section 18, the asymmetry adjustment section 19 has an asymmetry adjustment low pass filter 58 at a stage after an average detector 57, as shown in FIG. 4. The adjustment value of this filter is adversely affected by a defect.

After subjected to the gain adjustment, the offset adjustment, and the asymmetry adjustment, the RF signal is subjected to adaptive equalization by the FIR (Finite Impulse Response) filter 20 so as to PR equalize the RF signal to the desired PR class. FIG. 5 shows an example configuration of the FIR filter 20.

As shown in FIG. 5, nine tap coefficients are generated from the tap coefficient control section 23 according to an input reproduction signal. As a tap coefficient generating method, for example, an adaptive learning method called an LMS (Least Mean Square) algorithm shown in FIG. 6 is often employed.

In FIG. 6, a delay circuit receives each RF signal, and an arithmetic operation is performed with an error signal and an arithmetic section 64. The value obtained here is supplied to each corresponding filter 61. Each filter 61 has a flip-flop circuit 62 and an amplifier 63.

According to the learning method, from the output result of the viterbi decoder 21, the ideal signal/error signal calculator 22 generates an equalization error signal with respect to the target equalization characteristics. The tap coefficient control section 23 updates the tap coefficient so that the average of the square of the equalization error signal becomes the smallest. Thus, desired equalization characteristics can be achieved. The adaptive learning method using the LMS algorithm is specifically described in the IEICE (the Institute of Electronics, Information and Communications Engineering) Transactions, Vol. 81, No. 5, p.p. 497-505, May 1998.

Influence of Defect

As can be seen from FIG. 6, the tap coefficient control section 23, which is a learning circuit, keeps the learning results of the past in the internal flip-flop circuits, like the integration compensator formed by the primary low pass filters used in the duty adjustment section 18. When an abnormal equalization error signal is input to this region due to a defect, the learning is not directed in the intended direction, or might be even scattered and not be able to recover ever again.

A PR-equalized RF signal is next input to an optimum demodulator that performs demodulation according to the target PR class. Here, data that are input to the viterbi decoder 21 are demodulated as binary data. Based on the target PR class, the viterbi decoder 21 calculates a probability according to the correlation rule of intentionally added codes, and thus reproduces the most probable series. For example, if the FIR filter 20 equalizes a reproduced waveform to the PR (1221) characteristics, the viterbi decoder 21 selects the series with the smallest difference from the sample series of equalization signals among all the series that satisfy the PR (1221) characteristics. The viterbi decoder 21 then outputs the demodulation data corresponding to the selected series. By the PRML method, demodulation is performed not with only one sample value but a number of sample values. Accordingly, high resistance to signal deterioration components without any correlation among the sample values can be obtained.

The demodulated binary data are input to the synchronous demodulator section 28. On a DVD or a next-generation DVD that is now being developed, the top of each 1116-bit data set that is called "frame" has a 24-bit synchronization signal (a Sync code) that represents the starting position of each corresponding frame, as shown in FIG. 7. The synchronous demodulator section 28 detects the Sync code, and then synchronizes digital data and puts protection on the synchronization. The Sync code detecting method and the specific method of protecting synchronization utilizing the Sync code are disclosed in Patent document 2. In FIG. 7, PI parities PI0 to PI12 that are described later are also shown.

Based on modulation rules that are determined beforehand from the synchronized data, the synchronous demodulator section 28 performs the opposite demodulation, and transmits the resultant data as demodulation data to the ECC processor 41, which is a processor circuit at a later stage.

Meanwhile, in the optical disk device, clocks are extracted from reproduced waveforms to generate reproduced clocks to be input to the ADC 15. More specifically, the frequency detector 25 detects, from the reproduced waveform, the difference in frequency between the reproduced waveform and the signal frequency. The phase comparator 24 detects the phase difference from the ideal sampling point, and then performs a control operation.

The control operation is normally called "PLL (Phase Locked Loop) control", and the loop filter 26 performs both the frequency control and the phase control. The VCO (Voltage Controlled Oscillator) 27 supplies clocks. The loop filter 26 is normally formed with an integrator. When a defect is input, the output of the loop filter 26, i.e., the VCO control voltage, is adversely affected, and the lock on the PLL might be released.

The reproducing operation of an optical disk device utilizing the PRML signal processing method has been described so far. However, even with high-density recorded data, accurate data reproduction can be performed through PR equalization and optimum demodulation according to the PR class, as long as the interference rule (PR class) between the codes is set in advance. In an optical disk device that reproduces an optical disk through digital signal processing as described earlier, however, the control value and the adjustment value of the filter that are kept in each of the signal processing sections (the gain offset error detect section 16, the duty adjustment section 18, the asymmetry adjustment section 19, the tap coefficient control section 23, and the loop filter 26, for example) are disturbed by defect components that are read out of the data. In such a case, data reproduction cannot be steadily performed immediately after a recovery from the defective state, or even a recovery might be impossible. Therefore, the present invention employs a defect processing operation with DFMs that is described below, so as to realize a reproducing operation that is hardly affected by a defect.

<Measures Against Defects>

Figure 11:
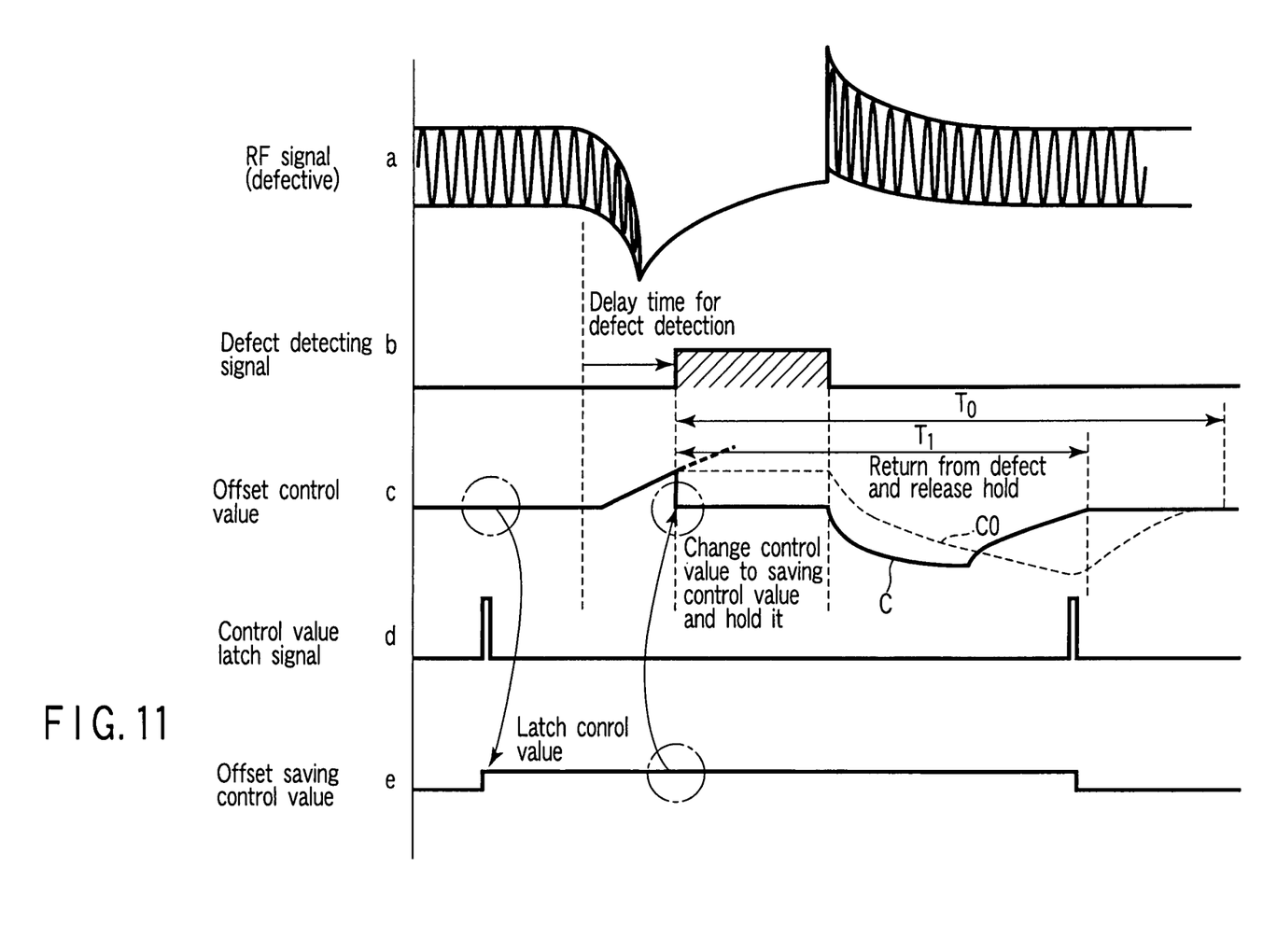
FIG. 11 shows graphs representative of a switching process in an offset control operation in the optical disk device according to the invention.
Figure 12:
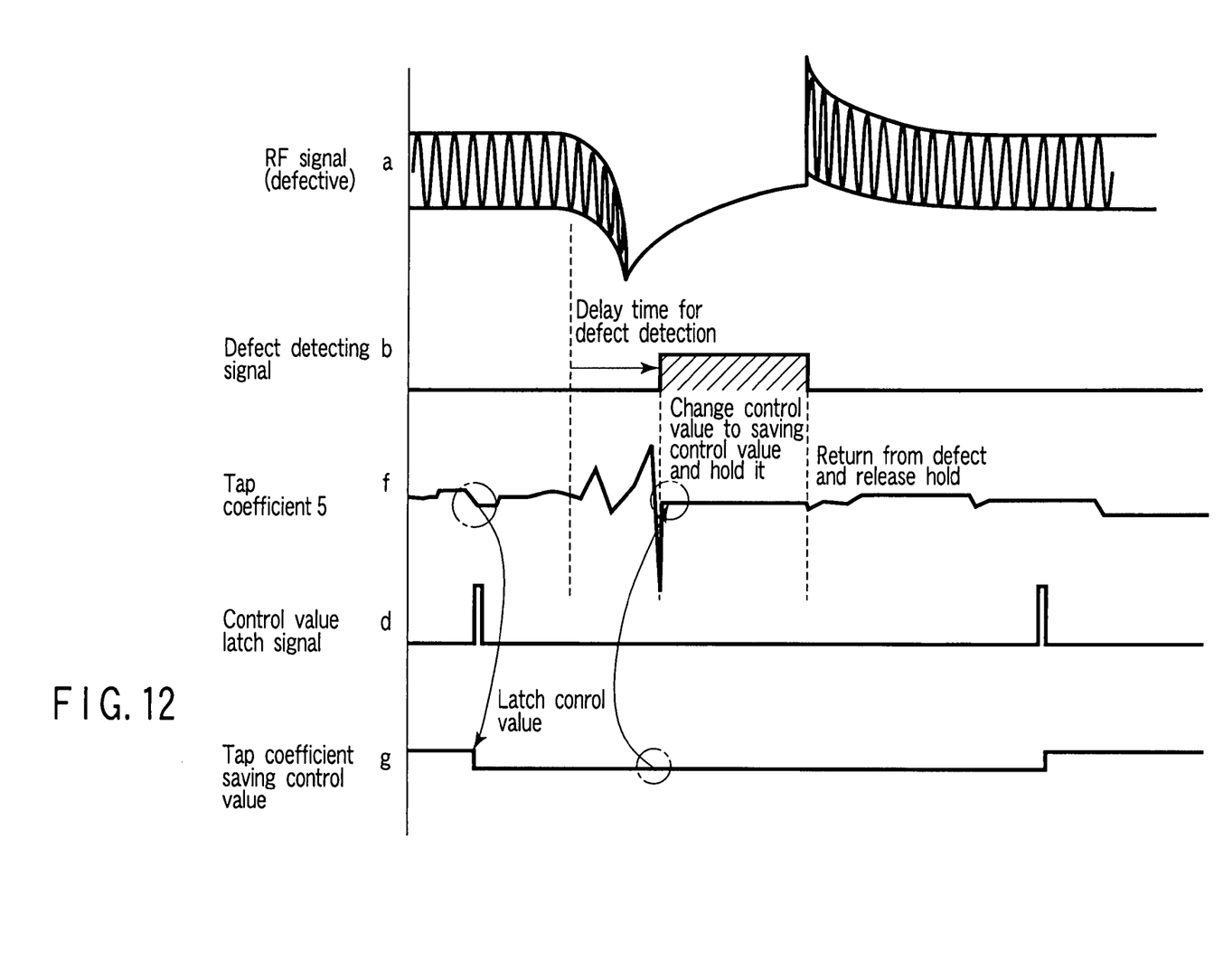
FIG. 12 shows graphs representative of variations with the center tap coefficient of the FIR filter of the optical disk device according to the invention.
Figure 13:
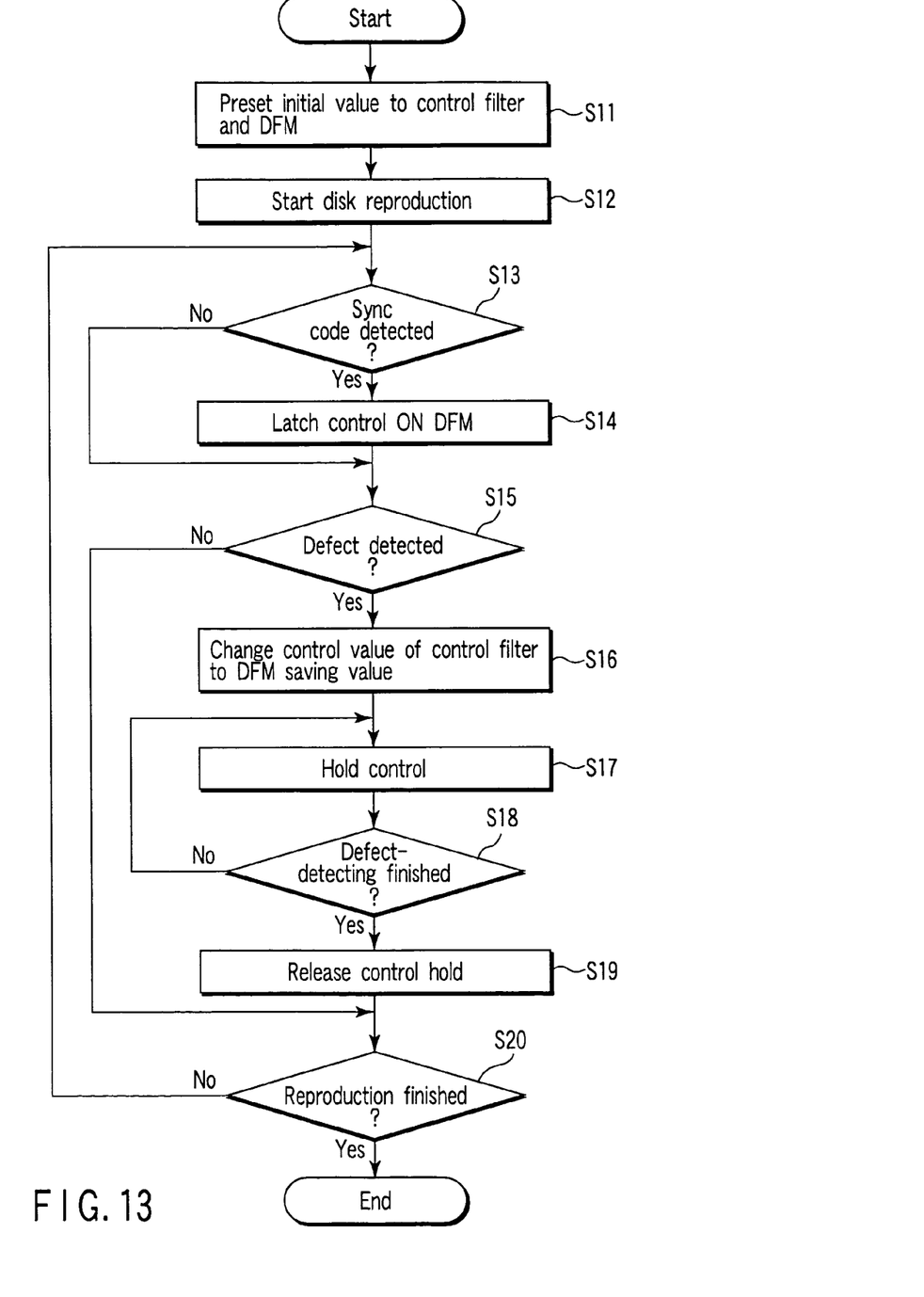
FIG. 13 is a flowchart of an operation to be performed against a defect by the optical disk device according to the invention.
Figure 14:
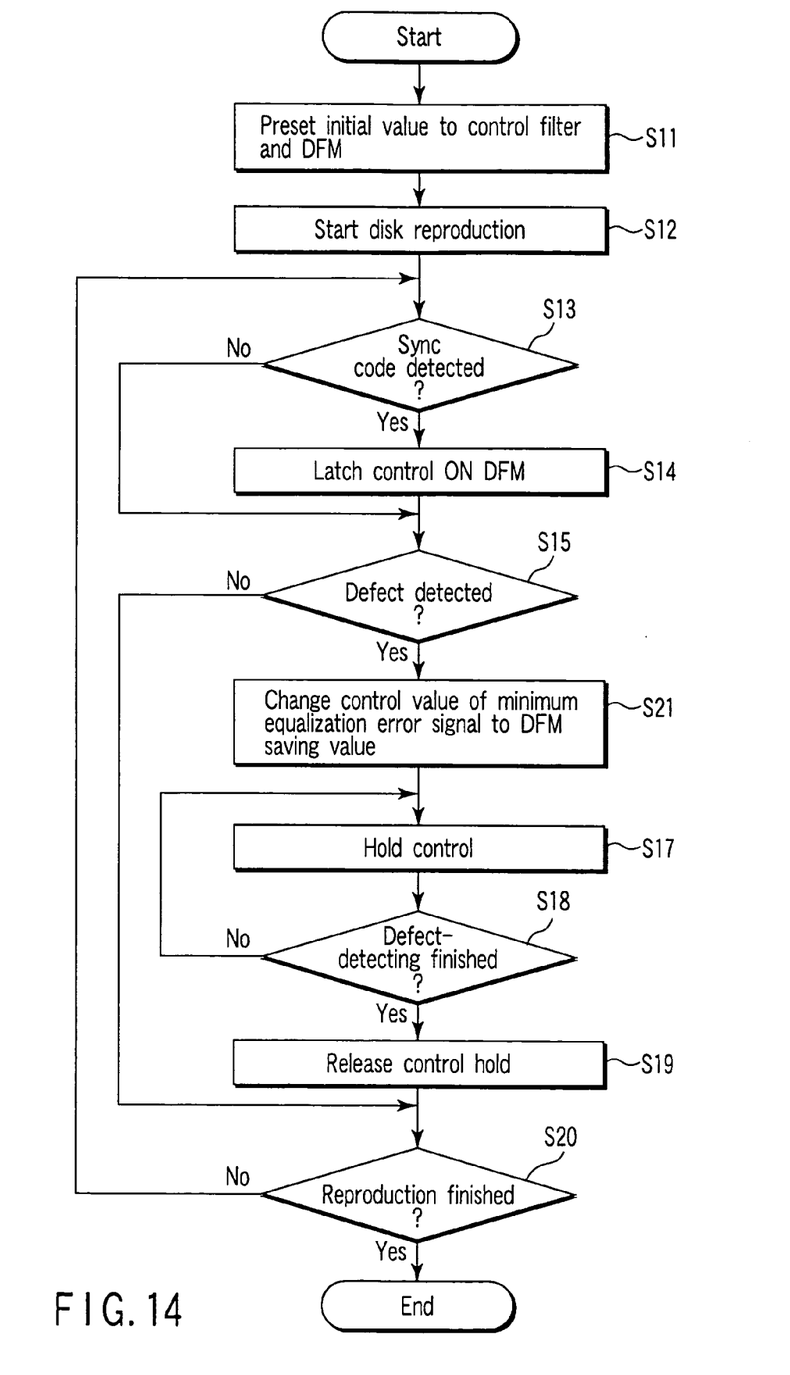
FIG. 14 is a flowchart of another operation to be performed against a defect by the optical disk device according to the present invention.

The measures to be taken against defects by the optical disk device according to the present invention are described below in detail, with reference to the accompanying drawings. FIG. 11 shows graphs representative of a switching process in the offset control in the optical disk device according to the invention. FIG. 12 shows graphs representative of variations in the center tap coefficient of the FIR filter of the optical disk device according to the invention. FIG. 13 is a flowchart of a defect processing operation to be performed in the optical disk device according to the invention. FIG. 14 is a flowchart of another example of a defect processing operation to be performed in the optical disk device according to the invention.

(Hold Process)

The measures to be taken against defects in the optical disk device according to the invention are mainly realized by the defect detector 30, the DFM controller 31, and the DFMs (DeFect management Memories) 32 to 36. Here, each of the DFMs 32 to 36 serves as a memory that latches and stores the control value and the adjustment value of each signal processing section while there is not a defect and data are being reproduced with high signal quality. The DFM controller 31 serves as a control circuit that supplies a control signal to each DFM, based on the defect detection result or the like supplied from the defect detector 30.

In the operation to be preformed to take measures against defects in the optical disk device according to the invention, an initial value is preset into each of the control filters and each of the DFMs immediately after the optical disk device is activated (step S11). Here, the control filters are the offset adjustment low pass filter 53 and the gain control low pass filter 54 of the gain offset error detect section 16 shown in FIG. 1, the duty adjustment low pass filter 56 of the duty adjustment section 18, the asymmetry adjustment low pass filter 58 of the asymmetry adjustment section 19, and the low pass filters 61 of the tap coefficient control section 23.

The DFMs are the DFM 32 connected to the gain offset error detect section 16 shown in FIG. 1, the DFM 33 connected to the duty adjustment section 18, the DFM 34 connected to the asymmetry adjustment section 19, the DFM 35 connected to the tap coefficient control section 23, and the DFM 36 connected to the loop filter 26.

Disk reproduction is started by a user operating an operations panel or the like (step S12). When a frame synchronization signal T (Sync code) is detected from the synchronous demodulator section 28 that has received an RF signal ("YES" in step S13), the DFM controller 31 performs control in such a manner that the process signal of the control value or the adjustment value in each processing section is latched from each corresponding flip-flop circuit via the switch 72 shown in FIG. 9, and is stored in each of the DFMs 32 to 36 (step S14).

Until the defect detector 30 detects a defect (step S15 or S20), the process of storing the process signal of the control value or the adjustment value into the DFMs 32 to 36 is repeated. Here, the storing of the process signal in the memory area may be carried out for every one frame of synchronization code signals, for every few frames, or for every 10 frames. In any way, it is preferable to select the optimum value for desired effects in the operation to be performed against defects.

When the defect detector 30 detects a defect ("YES" in step S15), the control values are supplied from the DEMs 32 to 36 to the control filters 53, 54, 56, 58, and 61, respectively, and the control value of each control filter is changed (step S16). The changed control value is held (step S17) until the defect is finished (step S18). When the defect is finished ("YES" in step S18), the hold is released (step S19). The procedures of steps S13 to S19 are repeated until the disk reproduction is completed (step S20).

In the above operation against defects, the control value of a normal operation is supplied to each of the control filters 53, 54, 56, 58, and 61, even when a defect occurs. In this manner, the normal reproducing operation can be continued, without being adversely affected by the defect.

With the value of each signal in the above case being the output of the offset adjustment low pass filter 53, an RF signal "a" that is a read signal has a black spot added after a HPF of 1 kHz at the previous stage, as shown in the graph of FIG. 11. If a defect occurs in the RF signal "a", a defect signal "b" that is the output of the defect detector 30 becomes active slightly after the occurrence of the defect. As can be seen from FIG. 11, the filter output "c" (indicated by a solid line) in the offset control has the control value disturbed by the defect. However, since the control value has already been replaced with the DFM output by virtue of the defect detection signal, the control operation is not disturbed and a stable reproducing operation can be continued even after the control hold is released at the end of the defect detection.

In the operation performed as a measure against defects according to the invention, the original signal value is restored during the defect recovery period $T_1$. On the other hand, in a case where the operation against defects according to the invention is not performed and the filter output $C_O$ (indicated by a broken line) is simply held the moment a defect is detected, it takes a long defect recovery time $T_0$ to restore the original signal value after the control hold is released at the end of the defect detection. This is because the recovery is done from an unreasonably high potential. By comparing the defect recovery time $T_1$ with the defect recovery time $T_0$ in the graph, it becomes apparent that a stable reproducing operation can be performed through the operation performed as a measure against defects.

FIG. 12 shows a graph representative of variations in the tap coefficients of the tap coefficient control section 23, especially a variation in the center tap coefficient 5 in the FIR filter 20. The value of tap coefficient 5 is also disturbed by a defect. However, the tap coefficient value stored in the corresponding DEM is changed, so that a tap coefficient 5f is immediately held as the saving control value of the tap coefficient 5. Thus, a stable learning operation can be performed after a recovery from the defect.

After the recovery from the defect, the DFM controller 31 may preferably issue an instruction to increase the loop gain of the control loop of each signal processing section. The gain at the time of follow-up in some signal processing sections might be set low. If the waveform of a reproduced signal such as a RF signal is changed due to an influence of the HPF after the end of the defect detection, the follow-up characteristics are improved by increasing the loop gain, and thus, the recovery operation can be performed in a shorter period of time.

After the recovery from the defect, the DFM controller 31 may preferably issue an instruction to increase the loop gain of the control loop of each signal processing section. The gain at the time of follow-up in some signal processing sections might be set low. If the waveform of a reproduced signal such as an RF signal "a" is changed due to an influence of the HPF after the end of the defect detection, the follow-up characteristics are improved by increasing the loop gain, and thus, the recovery operation can be performed in a shorter period of time.

In the flowchart of FIG. 14, step S21 replaces step S16 of FIG. 13. In step S21, the control value and the adjustment value are selected from the memory area when the equalization error signal of the demodulator is the smallest while the detector is not detecting a defect in reading (latch is performed for each Sync code). The selected control value and the adjustment value are supplied to each filter. Thus, more appropriate control and adjustment values with a smaller equalization error can be supplied to each filter.

In this manner, the control value should be changed to an appropriate value that is being held by virtue of the defect signal. Thus, a stable, high-quality signal reproducing operation can be performed after a recovery from the defect, without a disturbance in the control operation during the defect detection.

(Latch Process)

Next, the process of latching control and adjustment values into the DFMs 32 to 36 is described in detail as a preparation process for the above-described hold process. According to the present invention, the control value to be used as a hold value is regularly latched during a period in which the signal quality is high immediately before a defect occurrence. In other words, the Sync code detection signal of the synchronous demodulator section 28 is characteristically used as the timing for control value latching.

A Sync code (a frame synchronization code signal) is provided for every 1116 bits, as shown in FIG. 7, so that a detection signal is regularly generated during a normal reproducing operation with high signal quality. A Sync code is detected only when reproduced binary data completely match with all the predetermined 24 bits of the Sync code. Therefore, if a defect exists in the Sync code, the reproduction signal is disturbed, and the Sync code is not detected. Accordingly, by latching a control value every time a Sync code is detected, a control value during the defect period is avoided, and a control value during a high-quality reproducing operation can be latched.

Even if there are data that are not Sync code data but perfectly match with a Sync code due to an influence of a defect or the like, the control and adjustment values are not latched when a Sync code (a frame synchronization code signal) is wrongly detected, because the synchronous demodulator section 28 performs detection protection by virtue of the periodicity of the Sync code detection.

When a Sync code is detected, the synchronous demodulator section 28 transmits a Sync code detection signal to the DFM controller 31. The DFM controller 31 then transmits the Sync code detection signal as a control value latch timing signal to the DFMs 32 to 36 of each signal processing section. In each DEM, the control value is stored or updated in the memory upon receipt of each latch timing signal. This process is regularly repeated. Accordingly, the control value in each DFM is always the latest, reliable data, and can be used as the optimum hold value during the defect period.

The process of latching a control value upon receipt of each Sync code detection signal is shown in the lower rows in FIGS. 11 and 12, where a control value latch signal that is generated from a Sync code detection signal is denoted by "d", and the saving control values inside the DFMs that are updated at the time of latching are denoted by "e" and "g".

(Other Latch Processes and Hold Processes)

As another example of a latch process and a hold process, it is preferable to perform an control operation with the operation program (or the circuit configuration) of the DFM controller 31, so that the control and adjustment values of the frame located one frame before the frame synchronization signal at the time of detecting a defect are used. It is also preferable to store the control and adjustment values of the frame located a few frames earlier, so that the control and adjustment values can be selectively read out and held. In a case where the delay time of defect detection is long, it is preferable to selectively use the control and adjustment values of a frame located ten or more frames before defect detection, as long as a stable processing result is obtained. In this manner, the control and adjustment values to be used are selected from one of the past frames so as to achieve the optimum result.

It is also preferable to latch the control and adjustment values of the frame stored in the DFMs, without a limit to the number of frames the latch process can go back from the time of defect detection. It is also preferable to latch the control and adjustment values of the latest frame stored in the DFMs.

Also, the present invention is not limited to the above frame synchronization code signal (Synch code) detection in which a Sync code detection signal is generated only when a read signal matches with all the 24 bits of a reference signal. It is also possible to have such settings that a signal containing an error of 1 bit (or a few bits) at the time of regular reproduction may be regarded as a Sync code detection signal. It is also preferable to employ such a structure that the control values of a few frames, instead of the control value of just one frame, are stored in the DFMs, and the control values are selectively used.

In one of the above embodiments, the control value during a high-quality signal reproduction period is latched in synchronization with frame synchronization code signals supplied from the synchronous demodulator section 28. However, a latch process may also use the control and adjustment values (process signals) generated when the equalization error signal E supplied from the viterbi decoder 21 are the smallest. It is also preferable to calculate the PI syndrome from each of the PI (Parity of Inner-code) parities PI0 to PI12 shown in FIG. 7, and to use the control and adjustment values for the latch process and the hold process when the calculation result does not contain an error component (i.e., the calculation result is zero).

It is also preferable that only the PI syndrome or only the signal quality evaluation E or the combination of these two is used, instead of frame synchronization signals. It is also preferable to obtain an index signal that is not used in any of the above-described embodiments, and perform the latch process and the hold process on control and adjustment values (process signals), based on the index signal.

While the present invention can be realized by those skilled in the art through the above described embodiments, it will be also obvious to those skilled in the art that various modifications may be made to the above embodiments, and even those without an inventive genius should be able to make those modifications to the above embodiments. Therefore, the present invention is not limited to the embodiments specifically disclosed above, but other variations and modifications may be made without departing from the disclosed principles and novel matters of the present invention.

What is claimed is:

1. A disk drive comprising:
   a reading section which reads light reflected by a disk and outputs a read signal according to the read reflected light;
   a FIR filter which subjects the read signal to adaptive equalization;
   a tap coefficient control section which supplies the FIR filter with a tap coefficient;
   a detecting section which detects a reading defect in the reading section based on the read signal;
   a determining section which determines whether a sync code is present from a signal generated by decoding an output signal of the FIR filter;
   a storage section which stores an adjustment value calculated by the tap coefficient control section in a memory area when the determining section determines that the sync code is present; and
   a controller which, when the detecting section detects the reading defect, performs control so that the adjustment value is read out of the memory area of the storage section and is supplied to the tap coefficient control section.

2. A disk reproducing method comprising:
   reading light reflected by a disk and outputs a read signal according to the read reflected light;
   subjecting the read signal to adaptive equalization using a FIR filter;
   supplying the FIR filter with a tap coefficient using a tap coefficient control section;
   detecting a reading defect based on the read signal;
   determining whether a sync code is present from a signal generated by decoding an output signal of the FIR filter;
   storing an adjustment value calculated by the tap coefficient control section in a memory area when it is determined that the sync code is present; and
   when the reading defect is detected, performing control so that the stored adjustment value is read out of the memory area, and predetermined processing is performed based on the adjustment value.

* * * * *